United States Patent [19]

Andrews et al.

[11] 4,050,559

[45] Sept. 27, 1977

[54] VISCOUS SHEAR FLUID COUPLING

[75] Inventors: Jeffery Frederick Andrews, Rochester; Harjinder Singh Chauhan, Ilford; Ian Trevor Bristow, Rochester, all of England

[73] Assignee: Eaton Corporation, Cleveland, Ohio

[21] Appl. No.: 619,122

[22] Filed: Oct. 2, 1975

[51] Int. Cl.² ........................................ F16D 31/00
[52] U.S. Cl. .................................. 192/58 B; 64/26
[58] Field of Search .......................... 64/26; 192/58 B

[56] References Cited

U.S. PATENT DOCUMENTS

| 3,373,633 | 3/1968 | Desmond et al. | 192/58 B |
| 3,390,748 | 7/1968 | Hein et al. | 192/58 B |
| 3,404,832 | 10/1968 | Sutaruk | 192/58 B |
| 3,512,622 | 5/1970 | Sutaruk | 192/58 B |
| 3,910,391 | 10/1975 | Detty et al. | 192/58 B |

Primary Examiner—Samuel Scott
Assistant Examiner—Randall Heald
Attorney, Agent, or Firm—Teagno & Toddy

[57] ABSTRACT

A viscous shear rotary coupling comprises a rotary member mounted coaxially within a rotary housing is rotatable relative to the housing and has surfaces which are close to but spaced from internal surfaces of the housing. The spaces between these surfaces are occupied, in operation of the coupling by a viscous liquid. The rotary member is made up from a hollow steel shaft on which is secured, as by pressing, adhesive bonding, casting or friction welding, an element which is generally of disc form and which is made from aluminium.

1 Claim, 5 Drawing Figures

VISCOUS SHEAR FLUID COUPLING

This invention relates to rotary viscous shear fluid couplings of the kind (hereinafter termed the kind specified) comprising a rotary housing in which a rotary member is mounted for rotation relative to the housing, the member having a surface or surfaces which are close to but spaced from a surface or surfaces of the housing, and the space between said surfaces being occupied, in operation of the coupling, by a viscous fluid which serves to establish viscous drag between the housing and said rotary member.

According to this invention there is provided a viscous shear fluid coupling of the kind specified, wherein said rotary member comprises an element which is generally of disc form and which is made from aluminium, and a hollow steel shaft on which the aluminium disc element is secured. The disc element may for example be pressed, adhesively bonded, cast or friction welded in position on the shaft.

According to a preferred feature of the invention, the housing comprises an aluminium part providing a recess for the disc element, and a closure plate secured axially against said aluminium part to close off said recess by deformation of a lip of the aluminium part round the periphery of the plate.

The invention also provides a viscous fluid coupling of the kind specified wherein the housing comprises an aluminium part providing a recess for the rotary member, and a closure plate secured axially against said aluminium part to close off the recess by deformation of an annular lip of the aluminium part round the periphery of the plate. It is preferred to make the closure plate from steel.

Preferably the plate is annular and carries a seal for one end of the shaft.

In one construction, the said surfaces of the housing and the member comprise co-operating circumferentially-extending surfaces and co-operating radially-extending surfaces, and the said rotary member is supported and located, in operation of the coupling, by a thin film of said viscous fluid between said co-operating surfaces, seals being provided between the rotary part and the housing to prevent leakage of said viscous fluid. Grooves may extend radially at least part way across said radially-extending surfaces of the housing or the rotary member to assist in retaining the film of fluid intact.

In an alternative construction intended for heavy duty applications the housing carries a ball or roller bearing which in turn supports the said rotary member.

The invention will now be described in more detail with reference by way of example to the accompanying drawings in which.

Figure 1:
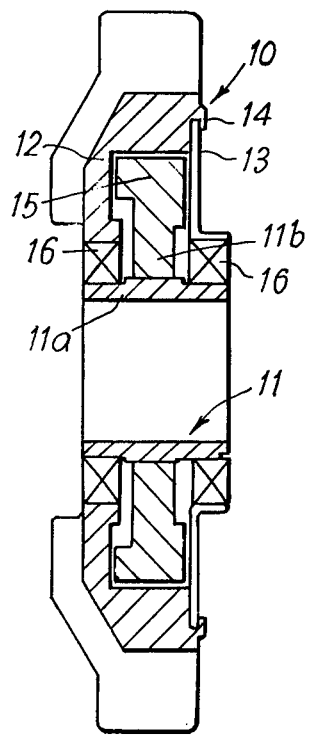
FIG. 1 shows in axial section a first coupling according to the invention.

The coupling shown in FIG. 1 comprises a rotary housing 10 and a rotary member 11 mounted within the housing for rotation relative to but coaxially with the housing. The housing comprises a first part 12, which is made from aluminium and which provides an annular recess for receiving the member 11, and a plate 13 which is pressed from steel sheet and which is secured in a shallow rebate about the periphery of the said recess in part 12 by rolling a lip 14 formed on the aluminium part 12 over the outer edge of the plate.

The rotary member 11 comprises a short hollow shaft 11a made from mild steel and an annular disc 11b made from aluminium and pressed on to straight knurling formed on the external surface of the shaft 11a after an adhesive has been applied to the knurling to ensure driving engagement between the shaft and the disc. The disc may alternatively be cast on or friction welded to the shaft.

The axial dimension of the disc is increased in the vicinity of the disc periphery and the surfaces of these peripheral portions 15 of the disc are disposed close to but spaced from complementary surfaces formed internally of the rotary member. A small quantity of a silicone fluid is disposed within the recess, leakage of the fluid from the housing being prevented by seals 16.

In use, the rotary member is supported and located in the housing on a thin film of the viscous fluid between the radially-extending surfaces and circumferentially-extending surfaces of the said peripheral portions of the disc and the co-operating surfaces of the part 12 and plate 13. Eight grooves 17 extend radially part-way or the whole way across the axial faces of the peripheral portions of the disc to retain the film intact.

One application of the illustrated coupling is in the cooling fan drive of the engine of a motor vehicle, the shaft 11a being secured to the drive shaft of a belt-driven pulley of the engine and the housing 10 having the engine cooling fan secured to it by bolts passed through holes (not shown) in the housing. On rotation of the pulley and rotary member 11 the silicone fluid is sheared, causing the housing and fan to be rotated at a lower speed than the member 11. As the input speed increases the percentage slip increases until, above a certain input speed within the normal operating speed range of the engine, the output speed, and hence the fan speed, remains substantially constant.

Figure 2:
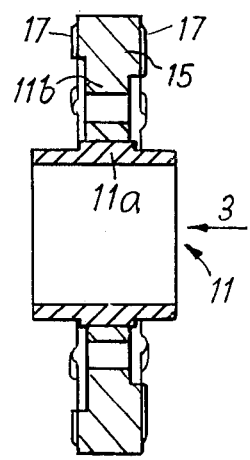
FIG. 2 shows in axial section the inner rotary member of the coupling of FIG. 1 in more detail.
Figure 3:
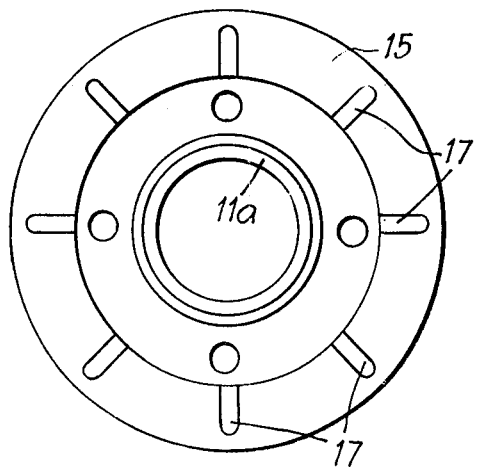
FIG. 3 is a view of the member of FIG. 2 in the direction of the arrow B.
Figure 4:
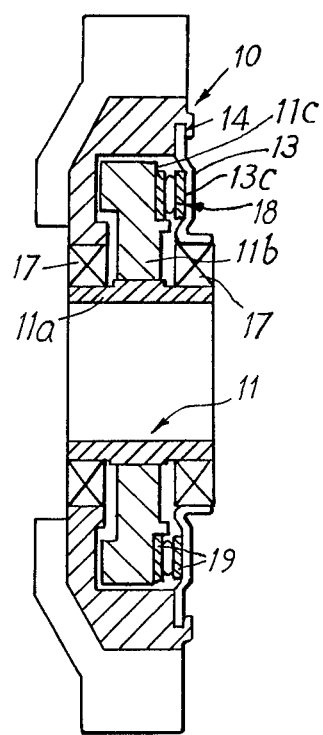
FIG. 4 shows a modified form of the coupling of FIGS. 1 to 3.

FIG. 4 illustrates a modified, heavier duty, form of the coupling shown in FIGS. 1 to 3, a needle roller thrust bearing assembly 18 including two race rings 19 which are respectively disposed in an annular recess 13a in plate 13 and in an annular rebate 11c in the facing surface of the peripheral portion of the disc 11b. The bearing is lubricated by the silicone fluid. Radial grooves 11a are of course not provided on the rebated radial end surface of the disc but may still be provided on the opposite end surface of the disc.

Figure 5:
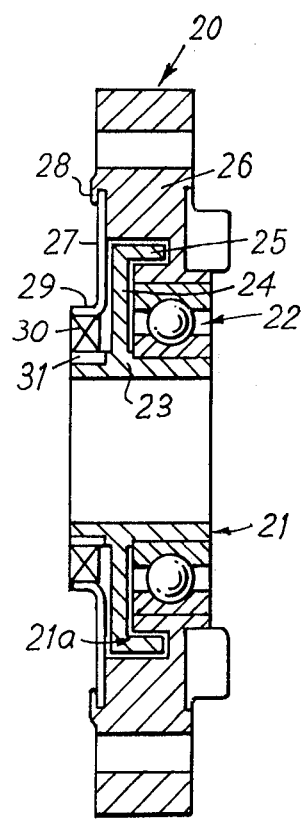
FIG. 5 shows a sectional elevation of another coupling according to the invention.

The coupling shown in FIG. 5 is another form of heavier duty coupling comprising a rotary housing 20 and a rotary member 21 mounted in a ball bearing 22 in the housing. The rotary member 21 in this construction is formed from aluminium and comprises a hollow boss 23 and a disc portion 24 having an axial flange 25 at its outer edge. The housing includes a main aluminium part 26 providing a recess for the rotary member 21, and an annular closure plate 27 which closes off the recess and which is held in abutment with an axial face of the part 26 by a lip 28 of the latter deformed over the outer edge of the plate. The inner edge portion of the plate has an out-turned flange 29 which carries a seal 30 engaging a steel insert 31 on one end of the boss 23 of the rotary member. There is only a small gap between the surfaces of the peripheral portion 21a of member 21 and the co-operating internal surfaces of the housing. A small quantity of a silicone fluid is placed in the recess. The operation of the coupling is the same as that of the construction shown in FIGS. 1 to 3 except that the housing 20 is supported by the bearing 22 on the rotary member 21 instead of by the film of silicone fluid between them.

We claim:

1. A viscous shear fluid coupling comprising a rotary housing, a rotary member mounted within the rotary housing for rotation relative to the rotary housing, the member having a surface thereof close to but spaced from an internal surface of the housing, and a viscous fluid occupying the space between said surfaces in operation of the coupling, said rotary member comprising an element which is generally of disc form and which is made from aluminum, and a shaft on which the aluminum disc element is secured, the housing comprising an aluminum part providing a recess for the disc element, a closure plate secured axially against the aluminum part to close off the recess, and a roller thrust bearing disposed between the closure plate and the facing surface of the aluminum disc element.

* * * * *